US012106894B2

(12) United States Patent
Xu et al.

(10) Patent No.: US 12,106,894 B2
(45) Date of Patent: Oct. 1, 2024

(54) WINDING DIE

(71) Applicants: Haihong Electric Co., Ltd., Jiangmen (CN); Guangdong Tritype Electric Co., Ltd., Jiangmen (CN)

(72) Inventors: Kaixuan Xu, Jiangmen (CN); Qingning Liang, Jiangmen (CN); Shuwei Situ, Jiangmen (CN); Yuxiang Qi, Jiangmen (CN); Danju Song, Jiangmen (CN); Wenjie Fang, Jiangmen (CN); Fei Li, Jiangmen (CN); Xueming Zhang, Jiangmen (CN); Yucheng Zhou, Jiangmen (CN); Wenhui Fang, Jiangmen (CN); Lizhen Zhai, Jiangmen (CN); Yixiong Liang, Jiangmen (CN)

(73) Assignees: Haihong Electric Co., LTD., Guangdong (CN); Guangdong Tritype Electric Co. LTD., Guangdong (CN)

( * ) Notice: Subject to any disclaimer, the term of this patent is extended or adjusted under 35 U.S.C. 154(b) by 0 days.

(21) Appl. No.: 17/765,280

(22) PCT Filed: Nov. 10, 2021

(86) PCT No.: PCT/CN2021/129876

§ 371 (c)(1),
(2) Date: Mar. 30, 2022

(87) PCT Pub. No.: WO2022/252497

PCT Pub. Date: Dec. 8, 2022

(65) Prior Publication Data

US 2024/0071685 A1 Feb. 29, 2024

(30) Foreign Application Priority Data

May 31, 2021 (CN) ........................ 202121200341.5

(51) Int. Cl.
*H01F 41/00* (2006.01)
*H01F 41/06* (2016.01)

(52) U.S. Cl.
CPC .................................... *H01F 41/06* (2013.01)

(58) Field of Classification Search
CPC ......... H01F 41/06; H01F 41/08; H01F 41/061
See application file for complete search history.

(56) References Cited

U.S. PATENT DOCUMENTS 4,491,284 A 1/1985 Vazquez et al.
2024/0047122 A1* 2/2024 Xu .......................... H01F 30/12

FOREIGN PATENT DOCUMENTS

CN 201256076 Y * 6/2009
CN 201259837 Y * 6/2009
(Continued)

OTHER PUBLICATIONS

Chinese International Search Report and Written Opinion and English Translation dated Jan. 28, 2022 issued in PCT/CN2021/129876 filed Nov. 10, 2021, consisting of 16 pages.
(Continued)

*Primary Examiner* — Emmanuel M Marcelo
(74) *Attorney, Agent, or Firm* — Weisberg I.P. Law, P.A.

(57) ABSTRACT

A winding die is disclosed, including: a gear baffle, where a middle portion of the gear baffle is provided with a first opening for placing an iron core post, and the gear baffle is provided with a first surface; and a cylinder, where the cylinder is arranged on the first surface of the gear baffle and connected with the gear baffle. The middle portion of the gear baffle is provided with the first opening for placing the iron core post, the gear baffle is fixedly connected with the cylinder, an external device is connected with a gear, and the cylinder on the gear baffle is driven to rotate around the iron core post by pulling the gear, so that a foil or an insulating
(Continued)

material on the cylinder can be wound on the iron core post, finally realizing a foil winding.

8 Claims, 3 Drawing Sheets

(56) References Cited

FOREIGN PATENT DOCUMENTS

| | | | | |
|---|---|---|---|---|
| CN | 202749223 | U | | 2/2013 |
| CN | 202749224 | U | * | 2/2013 |
| CN | 103310976 | A | | 9/2013 |
| CN | 103477404 | A | | 12/2013 |
| CN | 203351408 | U | * | 12/2013 |
| CN | 203351409 | U | * | 12/2013 |
| CN | 104103416 | A | * | 10/2014 |
| CN | 103500648 | B | * | 12/2015 |
| CN | 205092146 | U | * | 3/2016 |
| CN | 107342163 | A | * | 11/2017 |
| CN | 110853913 | A | * | 2/2020 |
| CN | 213935944 | U | | 8/2021 |

OTHER PUBLICATIONS

Japanese Office Action and English Translation dated Aug. 22, 2023 issued in Patent Application No. 2022-518646 filed Aug. 9, 2023, consisting of 6 pages.

Japanese Office Action and English Translation dated Jan. 23, 2024 issued in Patent Application 2022-518646 filed Jan. 18, 2024, consisting of 12 pages.

* cited by examiner

WINDING DIE

CROSS-REFERENCE TO RELATED APPLICATIONS

This application is a Submission under 35 U.S.C. § 371 for U.S. National Stage Patent Application of, and claims priority to, International Application Number PCT/CN2021/129876, entitled WINDING DIE, filed Nov. 10, 2021, which is related to and claims priority to Chinese Patent Application Number 202121200341.5, filed May 31, 2021, the entirety of all of which are incorporated herein by reference.

TECHNICAL FIELD

The disclosure relates to the technical field of electric power device, and more particularly, to a winding die.

BACKGROUND

Transformer, as one of important devices in electric energy transmission, provides reliable and uninterrupted energy for social and economic development. At present, due to the characteristics of energy saving, environmental protection and high efficiency, a stereoscopic wound iron core transformer has been widely used in all walks of life of the society. A foil winding has the advantages of good mechanical strength, deformation resistance, capability of bearing a short-circuit force, good electrical strength, even distribution of impulse gradient voltage and easy winding. Therefore, the stereoscopic wound iron core transformer employing the foil winding not only has the characteristics of the stereoscopic wound iron core, but also has the advantages of the foil winding. However, a foil winding machine, a winding die, a clamp and other special tooling devices are needed for manufacturing a foil coil of the stereoscopic wound iron core transformer. The foil winding machine has a high mechanization degree, there are high requirements for use of a device, skills of an operator and a winding process of the winding, generalization degrees of the winding die and the clamp are low, and different foil coils need to be matched with special winding dies and clamps.

SUMMARY

The disclosure aims to solve at least one of the technical problems in the existing technology. Therefore, the disclosure provides a winding die, which can simplify a winding process, improve universality of the winding die and reduce a manufacturing cost.

A winding die according to an embodiment of the disclosure includes: a gear baffle, wherein a middle portion of the gear baffle is provided with a first opening for placing an iron core post, and the gear baffle is provided with a first surface; and a cylinder, wherein the cylinder is arranged on the first surface of the gear baffle and connected with the gear baffle.

The winding die according to the embodiment of the disclosure at least has the following beneficial effects. The middle portion of the gear baffle is provided with the first opening for placing the iron core post, the gear baffle is fixedly connected with the cylinder, an external device is connected with a gear, and the cylinder on the gear baffle is driven to rotate around the iron core post by pulling the gear, so that a foil or an insulating material on the cylinder can be wound on the iron core post, finally realizing a foil winding.

When the foil winding is wound by using the winding die of the present application, only a power source needs to be provided to drive the gear baffle to rotate, so that not only a traditional foil winding machine can be eliminated, but also a winding process can be simplified and a manufacturing cost can be reduced, and universality of the die can also be improved by changing a height of the cylinder.

According to some embodiments of the disclosure, the gear baffle includes a first part and a second part, and the first part is detachably connected with the second part.

According to some embodiments of the disclosure, the winding die further includes a fixing plate, wherein the fixing plate includes a supporting portion and a fixing portion, the supporting portion is fixedly connected with the fixing portion, the fixing plate is rotatably connected with a second surface of the gear baffle through the supporting portion, and the fixing portion is provided with a first connecting hole for being fixed with an external device.

According to some embodiments of the disclosure, the winding die further includes a supporting plate, wherein the supporting plate includes a friction plate and a connecting plate, a middle portion of the friction plate is provided with a second opening, the connecting plate is arranged along the second opening, and the connecting plate is vertical to the friction plate.

According to some embodiments of the disclosure, the winding die further includes a track ring, wherein the track ring is arranged between the gear baffle and the fixing plate, the second surface of the gear baffle is provided with an annular track, the track ring is arranged on the annular track, and the track ring is fixedly connected with the fixing plate.

According to some embodiments of the disclosure, the track ring is provided with a groove, the fixing plate is provided with a boss, and the boss is arranged in the groove.

According to some embodiments of the disclosure, the groove is internally provided with a second connecting hole, the boss is provided with a third connecting hole, and the second connecting hole and the third connecting hole are correspondingly arranged.

According to some embodiments of the disclosure, an outside wall of the track ring is provided with a first oil groove.

According to some embodiments of the disclosure, the annular track is provided with a second oil groove.

According to some embodiments of the disclosure, the cylinder includes an outer cylinder and an inner cylinder, the outer cylinder is movably connected with the inner cylinder, and the outer cylinder is rotatable around an axis of the inner cylinder.

Other features and advantages of the disclosure will be described in the following specification, and are partially apparent from the specification, or are learned by implementing the disclosure. The objectives and other advantages of the disclosure may be implemented and obtained by the structure particularly pointed out in the specification, the claims and the drawings.

BRIEF DESCRIPTION OF THE DRAWINGS

The additional aspects and advantages of the disclosure will become apparent and easily understood from the descriptions of the embodiments with reference with the following drawings, wherein.

Figure 1:
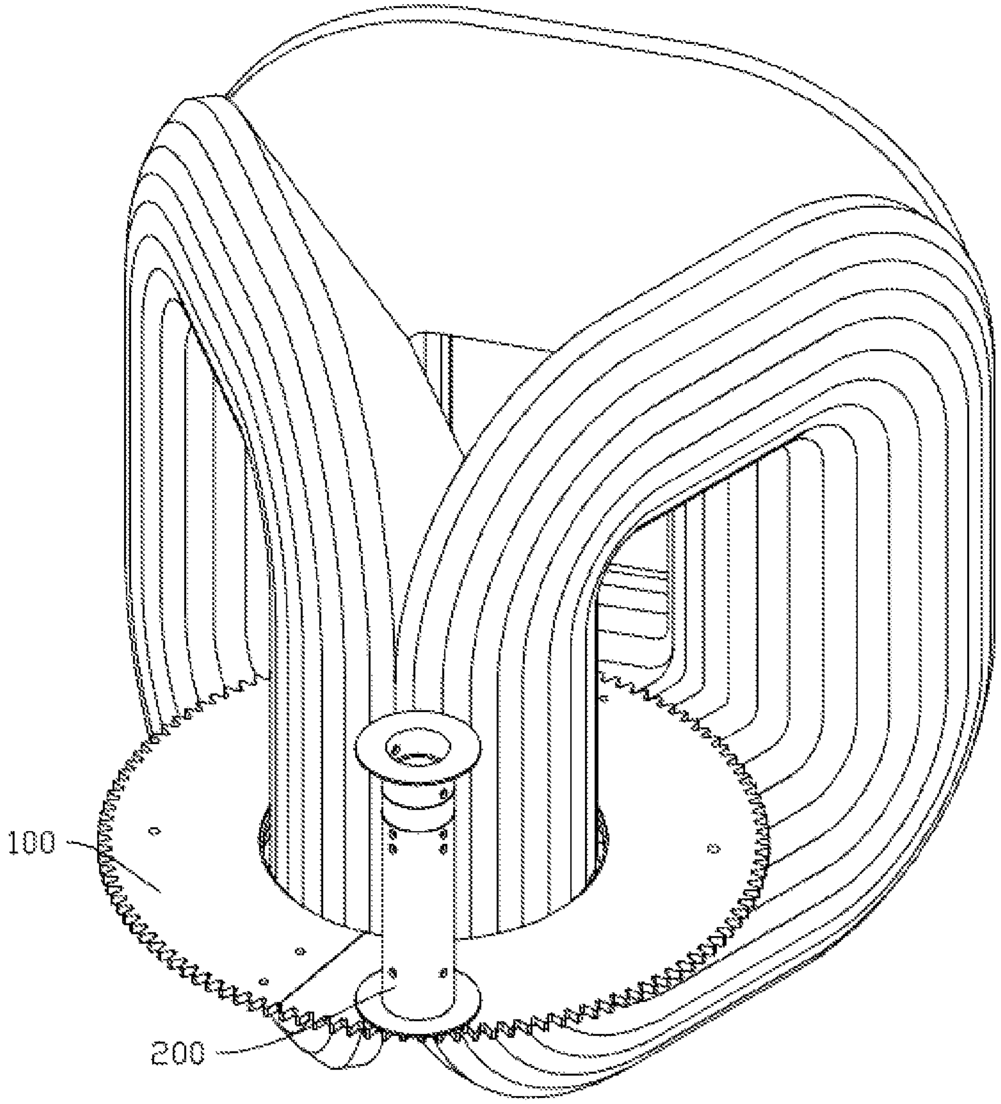
FIG. 1 is a schematic diagram of an application scenario of a winding die according to an embodiment of the disclosure.

Reference numerals are as follows: 100 refers to gear baffle, 110 refers to annular track, 111 refers to second oil groove, 200 refers to cylinder, 210 refers to inner cylinder, 220 refers to outer cylinder, 300 refers to fixing plate, 310 refers to supporting portion, 311 refers to boss, 312 refers to third connecting hole, 320 refers to fixing portion, 400 refers to supporting plate, 410 refers to friction plate, 420 refers to connecting plate, 500 refers to track ring, 510 refers to groove, and 520 refers to second connecting hole.

DETAILED DESCRIPTION

The embodiments of the disclosure are described below in detail. Examples of the embodiments are shown in the accompanying drawings. The same or similar numerals represent the same or similar elements or elements having the same or similar functions throughout the specification. The embodiments described below with reference to the accompanying drawings are exemplary, and are only used to explain the disclosure but should not be construed as a limitation to the disclosure.

In the description of the disclosure, it should be understood that the positional descriptions referred to, for example, the directional or positional relationships indicated by up, down, front, rear, left, right, etc., are based on the directional or positional relationships shown in the drawings, and are only for convenience and simplification of description of the disclosure, but not for indicating or implying that the referred device or element must have a specific direction, be constructed and operated in a specific direction, and thus should not be construed as limiting the disclosure.

In the description of the disclosure, “first” and “second” if described are only used to distinguish between technical features but cannot be used to indicate or imply relative importance or implicitly specify a quantity of indicated technical features or implicitly specify a sequential relationship of indicated technical features.

In the description of the disclosure, unless otherwise expressly defined, the terms such as “disposed”, “mounted”, and “connected” should be understood in a broad sense. For persons of ordinary skill in the art, specific meanings of the terms in the disclosure may be appropriately determined with reference to the specific content in the technical solution.

Figure 2:
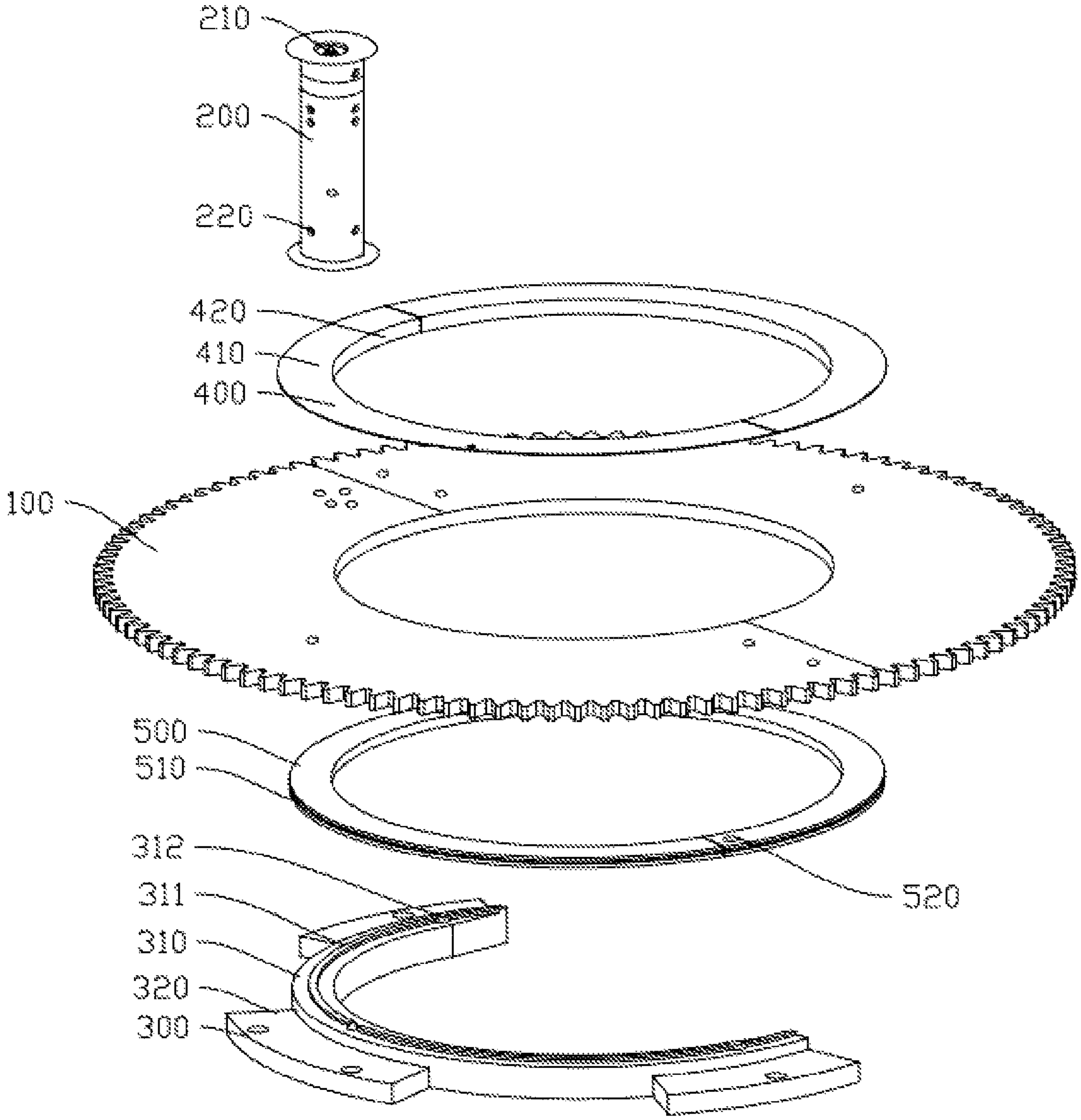
FIG. 2 is an exploded view of the winding die according to an embodiment of the disclosure shown in FIG. 1.

With reference to FIG. 1 and FIG. 2, the disclosure provides a winding die, which includes a gear baffle 100, wherein a middle portion of the gear baffle 100 is provided with a first opening for placing an iron core post, and the gear baffle 100 is provided with a first surface; and a cylinder 200, wherein the cylinder 200 is arranged on the first surface of the gear baffle 100 and connected with the gear baffle 100. The middle portion of the gear baffle 100 is provided with the first opening for placing the iron core post, the gear baffle 100 is fixedly connected with the cylinder 200, an external device is connected with a gear, and the cylinder 200 on the gear baffle 100 is driven to rotate around the iron core post by pulling the gear, so that a foil or an insulating material on the cylinder 200 is wound on the iron core post, to realize a foil winding. When the foil winding is wound by using the winding die of the present application, only a power source needs to be provided to drive the gear baffle 100 to rotate, so that not only a traditional foil winding machine can be eliminated, but also a winding process can be simplified and a manufacturing cost can be reduced, and universality of the die can also be improved by changing a height of the cylinder 200.

It can be understood that one or more cylinders 200 may be provided, and when multiple cylinders 200 are provided, different cylinders 200 are provided with different materials, such as a foil tape or an insulating material.

It can be understood that the gear baffle 100 may be composed of several parts, and when the gear baffle 100 is mounted outside the iron core post, the gear baffle 100 is disassembled first, then the iron core post is placed in the first opening, and all parts of the gear baffle 100 are fixedly connected.

It should be noted that the gear baffle 100 may include a first part and a second part, and the first part is detachably connected with the second part.

Specifically, the gear baffle 100 may be composed of the first part and the second part, and when the gear baffle 100 is mounted outside the iron core post, the first part and the second part are disassembled first, then the iron core post is placed in the first opening, and the first part and the second part are fixedly connected.

It can be understood that the first part and the second part may be connected in a snap-fit manner or by using a screw, which is not limited herein.

It should be noted that the winding die further includes a fixing plate 300, wherein the fixing plate 300 includes a supporting portion 310 and a fixing portion 320, the supporting portion 310 is fixedly connected with the fixing portion 320, the fixing plate 300 is rotatably connected with a second surface of the gear baffle 100 through the supporting portion 310, and the fixing portion 320 is provided with a first connecting hole for being fixed with an external device. By arranging the fixing plate 300, stability of a rotation plane is ensured during rotation of the gear baffle 100, and then the foil tape or the insulating material can be wound more stably, so as to improve winding stability.

It should be noted that the winding die further includes a supporting plate 400, wherein the supporting plate 400 includes a friction plate 410 and a connecting plate 420, a middle portion of the friction plate 410 is provided with a second opening, the connecting plate 420 is arranged along the second opening, and the connecting plate 420 is vertical to the friction plate 410. By arranging the supporting plate 400, friction of the foil tape or the insulating material on the gear baffle 100 during winding can be reduced, and then a service life of the gear baffle 100 can be prolonged and quality of the winding can be ensured.

It can be understood that the supporting plate 400 includes a first supporting plate and a second supporting plate. When the winding die is mounted on the iron core post, the first supporting plate and the second supporting plate are placed on the gear baffle 100, wherein the first supporting plate and the second supporting plate may be fixedly connected, or may not be connected, and it is only necessary to reduce the friction of the foil tape or the insulating material on the gear baffle 100 during winding on the iron core post.

Figure 3:
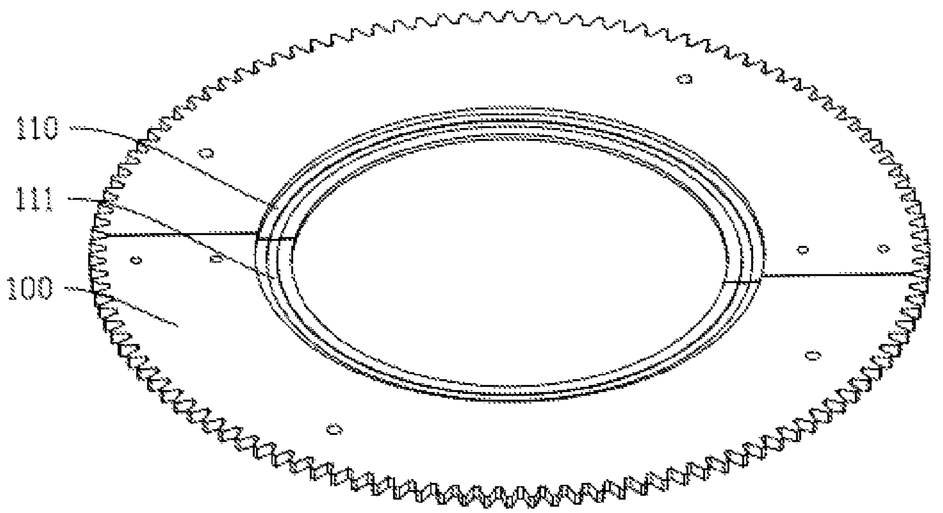
FIG. 3 is a schematic diagram of a gear baffle of the winding die according to an embodiment of the disclosure shown in FIG. 1.

With reference to FIG. 3, it should be noted that the winding die further includes a track ring 500, wherein the track ring 500 is arranged between the gear baffle 100 and the fixing plate 300, the second surface of the gear baffle 100 is provided with an annular track 110, the track ring 500 is arranged on the annular track 110, and the track ring 500 is fixedly connected with the fixing plate 300. By arranging the track ring 500, a friction force between the gear baffle 100 and the fixing plate 300 can be reduced, so as to improve rotation stability of the gear baffle 100, and prolong a service life of the gear baffle 100 and a service life of the fixing plate 300.

Specifically, the track ring 500 includes a first track ring and a second track ring. When the winding die is mounted on the iron core post, the first track ring and the second track ring are fixedly connected, and then the track ring 500 is arranged between the gear baffle 100 and the fixing plate 300 to provide a track for rotation of the gear baffle 100, so as to improve the rotation stability of the gear baffle 100, and prolong the service life of the gear baffle 100 and the service life of the fixing plate 300.

It can be understood that the track ring 500 is provided with a boss, the fixing plate 300 is provided with a groove, and the boss is arranged in the groove to fix the track ring 500 with the fixing plate 300.

With reference to FIG. 2, it should be noted that the track ring 500 is provided with a groove 510, the fixing plate 300 is provided with a boss 311, and the boss 311 is arranged in the groove 510. By arranging the groove 510 and the boss 311, the track ring 500 is connected with the fixing plate 300, so as to fix the track ring 500 with the fixing plate 300.

It should be noted that the groove 510 is internally provided with a second connecting hole 520, the boss 311 is provided with a third connecting hole 312, and the second connecting hole 520 and the third connecting hole 312 are correspondingly arranged. By arranging corresponding connecting holes in the groove 510 and the boss 311, a fixing member such as a screw may penetrate through the connecting holes to fix the track ring 500 and the fixing plate 300, and then the track ring 500 is connected with the fixing plate 300 more stably.

It can be understood that multiple connecting holes may be provided, and the connecting holes are evenly distributed in the boss 311.

It should be noted that an outside wall of the track ring 500 is provided with a first oil groove. By arranging the first oil groove, a lubricating oil can be added into the oil groove, which reduces friction at a mutually contacted part between the outside wall of the track ring 500 and a side wall of the annular track 110, so as to improve the rotation stability of the gear baffle 100, prolong the service life of the gear baffle 100 and the service life of the track ring 500, then wind the foil tape or the insulating material more stably, and improve winding stability.

It should be noted that the annular track 110 is provided with a second oil groove 111. By arranging the second oil groove 111, a lubricating oil can be added into the oil groove, which reduces friction at a mutually contacted part between a top surface of the track ring 500 and a bottom surface of the annular track 110, so as to improve the rotation stability of the gear baffle 100, prolong the service life of the gear baffle 100 and the service life of the track ring 500, then wind the foil tape or the insulating material more stably, and improve the winding stability.

It should be noted that the cylinder 200 includes an outer cylinder 220 and an inner cylinder 210, the outer cylinder 220 is movably connected with the inner cylinder 210, and the outer cylinder 220 is rotatable around an axis of the inner cylinder 210. By arranging the inner cylinder 210 and the outer cylinder 220, the foil tape or the insulating material wound on the outer cylinder 220 can be stably and rapidly conveyed outwardly along with rotation of the outer cylinder 220, so as to improve winding efficiency of the winding die.

The operating principle of the disclosure is further described hereinafter.

Before use, all parts of the gear baffle 100 and the track ring 500 are disassembled first, and fixedly connected around the iron core post respectively. The supporting plate 400, the gear baffle 100, the track ring 500 and the fixing plate 300 are connected in sequence. The cylinder 200 is selected according to specifications of the foil tape or the insulating material, and the cylinder 200 is fixedly connected with the gear baffle 100. The fixing plate 300 is fixedly connected with the external device, the gear on the gear baffle 100 is connected with an external power device, the gear baffle 100 is driven to rotate through the external device, and then the cylinder 200 is driven to rotate, so that the foil tape or the insulating material is wound on the iron core post to implement winding of the foil tape or the insulating material.

It can be seen from the description above that the middle portion of the gear baffle 100 of the winding die according to the disclosure is provided with the first opening for placing the iron core post, the gear baffle 100 is fixedly connected with the cylinder 200, the external device is connected with the gear, and the cylinder 200 on the gear baffle 100 is driven to rotate around the iron core post by pulling the gear, so that the foil or the insulating material on the cylinder 200 is wound on the iron core post, finally realizing the foil winding. When the foil winding is wound by using the winding die of the present application, only a power source needs to be provided to drive the gear baffle 100 to rotate, so that not only a traditional foil winding machine can be eliminated, but also a winding process can be simplified and a manufacturing cost can be reduced, and universality of the die can also be improved by changing a height of the cylinder 200. By arranging the fixing plate 300, the stability of the rotation plane can be ensured during rotation of the gear baffle 100, and then the foil tape or the insulating material can be wound more stably, so as to improve the winding stability. By arranging the supporting plate 400, the friction of the foil tape or the insulating material on the gear baffle 100 during winding can be reduced, and then the service life of the gear baffle 100 can be prolonged and quality of the winding can be ensured. By arranging the track ring 500, the friction force between the gear baffle 100 and the fixing plate 300 can be reduced, so as to improve the rotation stability of the gear baffle 100, and prolong the service life of the gear baffle 100 and the service life of the fixing plate 300.

The embodiments of the disclosure are described in detail with reference to the accompanying drawings above, but the disclosure is not limited to the above embodiments, and various changes may also be made within the knowledge scope of those of ordinary skills in the art without departing from the purpose of the disclosure.

The invention claimed is:

1. A winding die, comprising:

a gear baffle, wherein a middle portion of the gear baffle is provided with a first opening for placing an iron core post, and the gear baffle is provided with a first surface;

a cylinder, wherein the cylinder is arranged on the first surface of the gear baffle and connected with the gear baffle;

a fixing plate, wherein the fixing plate comprises a supporting portion and a fixing portion, the supporting portion is fixedly connected with the fixing portion, the fixing plate is rotatably connected with a second surface of the gear baffle through the supporting portion, and the fixing portion is provided with a first connecting hole for being fixed with an external device; and a track ring, wherein the track ring is arranged between the gear baffle and the fixing plate, the second surface of the gear baffle is provided with an annular track, the track ring is arranged on the annular track, and the track ring is fixedly connected with the fixing plate.

2. The winding die of claim 1, wherein the gear baffle further comprises:

a first part; and a second part, and the first part is detachably connected with the second part.

3. The winding die of claim 1, further comprising a supporting plate, wherein the supporting plate comprises a friction plate and a connecting plate, a middle portion of the friction plate is provided with a second opening, the connecting plate is arranged along the second opening, and the connecting plate is vertical to the friction plate.

4. The winding die of claim 1, wherein the track ring is provided with a groove, the fixing plate is provided with a boss, and the boss is arranged in the groove.

5. The winding die of claim 4, wherein the groove is internally provided with a second connecting hole, the boss is provided with a third connecting hole, and the second connecting hole and the third connecting hole are correspondingly arranged.

6. The winding die of claim 1, wherein an outside wall of the track ring is provided with a first oil groove.

7. The winding die of claim 1, wherein the annular track is provided with a second oil groove.

8. The winding die of claim 1, wherein the cylinder comprises an outer cylinder and an inner cylinder, the outer cylinder is movably connected with the inner cylinder, and the outer cylinder is rotatable around an axis of the inner cylinder.

* * * * *